July 4, 1939.　　　　J. WOERMANN　　　　2,164,980
FILM MUTILATOR
Filed Dec. 3, 1937　　　　2 Sheets-Sheet 1

INVENTOR
JACOB WOERMANN.
BY
Van Deventer + Gries
ATTORNEYS

July 4, 1939.  J. WOERMANN  2,164,980
FILM MUTILATOR
Filed Dec. 3, 1937  2 Sheets-Sheet 2
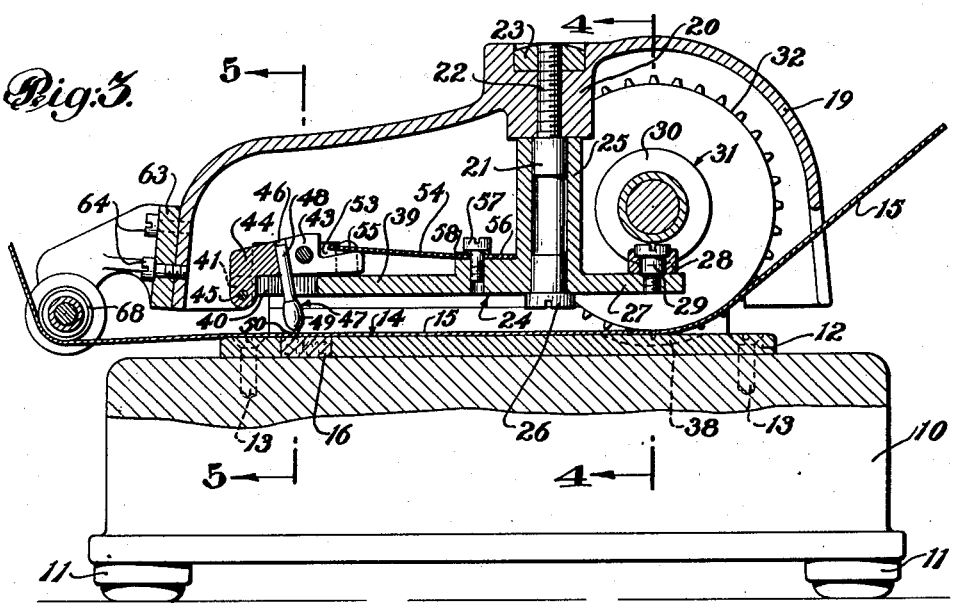
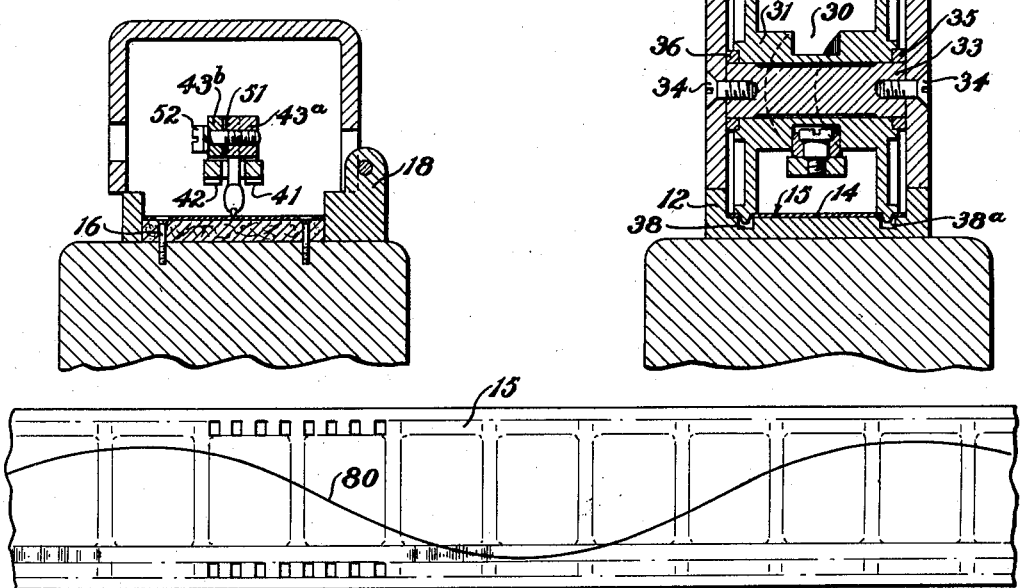
INVENTOR
JACOB WOERMANN
BY
Van Deventer & Gries
ATTORNEYS Patented July 4, 1939

2,164,980

UNITED STATES PATENT OFFICE 2,164,980

FILM MUTILATOR

Jacob Woermann, Glendale, Long Island, N. Y.

Application December 3, 1937, Serial No. 177,865

14 Claims. (Cl. 33—27)

This invention relates to improvements in film mutilators and has for a principal object the provision of a device for rendering motion picture films incapable of further use.

Another object of the invention is the provision, in a film mutilating device, of an oscillating arm motivated in a definite relation to the movement of the film for moving a tool in contact with the emulsion of said film to remove portions thereof along its length.

A further object of the invention is the provision in a film mutilator of means for scratching off the emulsion along a line constantly changing in direction not only from the picture portion of the film but also from the sound track at intervals, whereby if said film or copies therefrom are subsequently projected, auditory and visual effects are produced which are beyond the range of human endurance.

Still another object of the invention is the provision of an oscillating diamond or sapphire point harmonically moved by the passage of the film therethrough (for example, while the film is being rewound) to produce in the emulsion face of the film a curved scratch extending lengthwise of the film and crossing both the pictures and the sound track. This curve would preferably be in a form of a sine curve and when such a scratch is applied throughout the length of the film and said film is projected, a plurality of jumping crosses are produced in the picture. These crosses jump from side to side and torture the viewer's eyes. At the same time, the portion of the scratch which crosses the sound track produces a series of loud thumpings along with the sound, which may be likened to the native African "tom-tom" drums and since the scratch is clear, the volume of the thumping is at a much higher level than that of the music or voice in the sound track, making it practically impossible to hear said music and voices over the din of the thumping.

Another object of the invention is the provision of a film mutilator having a weighted base so that said device may be placed between the reels of the rewinding machine on the table and the film may be mutilated without the necessity of screwing, or otherwise securing, the device to the table.

Other objects will be obvious to those skilled in the art.

Referring to the drawings:

Figure 3 is a sectional elevation of the new and improved film mutilator;

Figure 4 is a transverse section of the device along the lines 4—4, Figure 3;

Figure 5 is a cross section of the device along the lines 5—5, Figure 3; and

Figure 6 is a view of a portion of the film which has been mutilated by the new and improved device.

Figure 1:
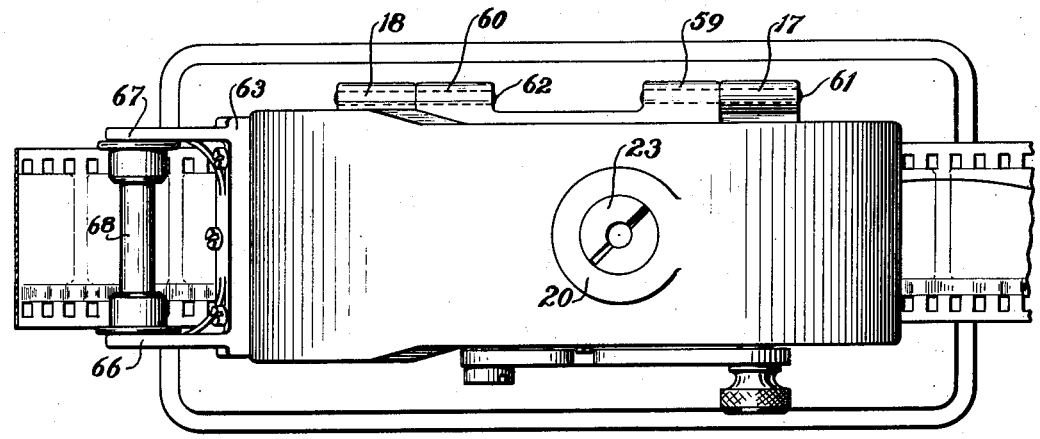
Figure 1 is a plan view of the new and improved film mutilator showing a film passing therethrough.

A base 10 is provided with a plurality of rubber feet 11 and forms a support for the mechanism. A channeled plate 12 is secured to the upper surface of the base 10 in any suitable manner; for example, by screws 13. The channeled portion 14 of the plate forms a surface along which the film 15, Figure 3, travels.

A non-metallic insert 16 is set into the surface 14 near one end of the channeled member 12 and the surface of this insert cooperates with a cutting device, to be presently described, to effect the mutilation of the film.

Referring now to Figures 1 and 5, it will be noted that the channeled member 12 is provided with bosses 17 and 18 which are spaced apart from each other and form part of a hinged joint, which will presently be described.

The mechanism is enclosed in a housing 19. A boss 20 formed integral with the housing 19 forms a support for a shouldered screw 21. The threaded portion 22 of the screw engages threads in the boss 20 and a suitable lock nut 23 is recessed in the top surface of the boss 20 and is provided for locking the shouldered screw 21 in position.

A lever, generally designated by the numeral 24, is provided with an upwardly extending boss 25 which is bored out to form a bearing on the screw 21. The length of the screw 21 between the boss 20 and the head 26 is preferably a few thousandths greater than the thickness of the lever 24 and its boss 25.

A portion 27 of the lever 24 extends to the right, as shown in Figure 3, and carries a hardened roller 28. The roller 28 is pivotally mounted on a shouldered screw 29. The roller engages and is driven by a spiral slot 30 formed in the hub 31 of the sprocket 32. The sprocket 32 is pivotally mounted on a shaft 33 which extends transversely in the housing 19 and which is firmly secured to said housing by means of screws 34. Suitable washers 35 and 36 serve to position the sprocket centrally within the housing 19 and to eliminate any end play of the sprocket on the shaft.

The teeth 37 of the sprocket engage sprocket holes in film 15 and clearance grooves 38, 38a are provided in the channeled member 12 to clear the teeth at the bottom of the sprocket.

The portion 39 of the lever 24 extends to the left, as viewed in Figure 3, and is provided at one end thereof with a slot 40 through which the cutter arm, to be presently described, extends. The end of the portion 39 is provided with bosses 41 and 42 spaced apart the width of the slot 40. A tool support 43 has a projecting ear 44 which extends between the bosses 41 and 42 and a pin 45 passing through holes formed in the bosses 41 ad 42 and the rear 44, serves to pivotally support the tool support 43 upon the lever 24.

The support 43 has a hole 46 formed therein to accommodate the tool. The hole 46 is preferably on a slant, making a slight angle with the vertical. The tool, generally designated by the numeral 47, is comprised of a shank 48 fitting the hole 46 and a head 49 carrying the tool proper which is designated by the numeral 50 and which may preferably consist of a diamond or sapphire point.

The support 43, Figure 5, has a longitudinal slot 51 extending from the right end, as viewed in Figure 3, to the hole 46, and a screw 52 threaded into the portion 43a serves to clamp the portion 43b to the portion 43a and thereby tightly secure the shank 48 in the supporting member 43. The supporting member 43 has a notch 53 formed therein and a spring 54, Figure 3, has one end 55 thereof engaging the supporting member 43 via said notch. The other end 56 of the spring is suitably secured to the lever 24 by means of a screw 57 and lock washer 58.

The casing 19, Figure 1, is provided with bosses 59 and 60 which respectively member up with the bosses 17 and 18. Aligned holes in the bosses 17 and 59 are provided with a pivot pin 61, and aligned holes in the boss 18 and 60 are provided with pivot pin 62, said pins being aligned with each other to form a hinged mounting for the housing 19 and its mechanism.

Figure 2:
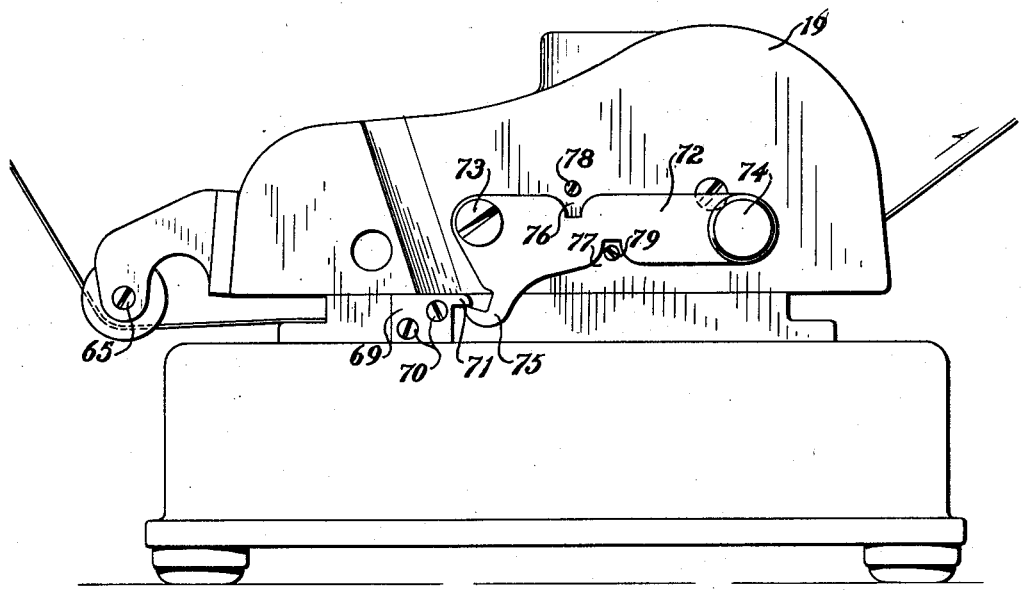
Figure 2 is a side elevation of the device shown in Figure 1 showing the path of the film from one of the reels via the mutilator and toward the other of the reels (the reels not being shown)

A yoke 63 secured to the left end of the housing, as viewed in Figure 3, by means of screws 64, forms a support for a screw shaft 65, Figure 2, and a film roller 68, Figures 1 and 3, is mounted on the shaft 65 between the arms 66 and 67 of the yoke 63.

A locking plate 69, Figure 2, is secured to the channeled plate 12 by means of screws 70 and is provided with a projection 71. A lever 72 is pivotally mounted on the outside of the casing 19 by means of a shouldered screw 73 at one end thereof and is provided with a knurled knob 74 at the other end thereof, the knob 74 being used to move the lever 72 on its pivot.

The lever 72 is provided with an extension 75 which normally engages the projection 71 and notch 76 formed in the lever 72 cooperates with a screw 78 in the housing 19 to form a stop limiting the upward movement of the lever. A similar notch 77 formed in the lever cooperates with a screw 79 in the housing 19 to form a stop limiting the downward movement of the lever 72. The weight of the knob 74 is sufficient to keep the members 75 and 71 in engagement and to lock the device in the closed position.

In using the device, it is positioned on a table between the two reels of the rewinder, the housing 19 with the mechanism is turned back on its pivot pins 61, 62, thereby making the channel 14 in the plate 12 accessible. The film is laid in the channeled plate with the emulsion side up, after which the housing 19 and the mechanism is brought forward to the normal, closed, position, as shown in Figures 2 and 3. The film being joined to the reel upon which it is to be rewound, the operator makes sure that the teeth 37 of the sprocket 32 mesh with the sprocket holes in the film and then makes sure that the film engages the roller 68, whereupon the rewinding operation is carried forward.

The path of the film through the mutilating device can readily be seen in Figure 3 and it will be noted that as the sprocket 32 is rotated by the film its spiral slot in the hub imparts to the arm 24 an oscillatory movement with the result that the diamond or sapphire point is carried back and forth across the film along the non-metallic insert 16 and since the film is in motion, the scratch is produced by the point in the form of a sign curve such as is illustrated in Figure 6, the scratch being designated by the numeral 80.

It will be noted that the scratch traverses seven frames and that at the eighth frame and a little to each side thereof, it traverses the sound track. It will also be noted that on each frame of each of the seven frames the scratch is in a different position. Since the moving picture machine projects these frames intermittently each and every scratch will be shown on the screen and since these scratches appear in different positions the resultant picture viewed appears to be filled with a series of crosses jumping from side to side across the picture at a rapid rate and torturing the eyes of the viewers.

If the projector projects 24 frames per second and at every eighth frame the sound track has a comparatively long scratch which produces a loud thump, the rate of these thumps would be three times per second, which would, due to the fact that the scratch will pass more light to the photo-electric cell than the remainder of the sound track, be quite loud as compared to the sound record in the film, therefore it would be impossible to hear the recording over these loud thumps.

Films mutilated by the new and improved device herein shown and described cannot be used again nor can prints therefrom be used.

Although a simple embodiment of the device is herein shown and described, it is obvious that many changes may be made in the device without departing from the invention as set forth in the annexed claims.

What is claimed is:

1. In a film mutilating device, means defining a path for said film through said device, and a cutter contacting the emulsion side of said film and mechanism engaged by said film and associated with said cutter for moving the latter in a definite path when said film is moved through said device.

2. In a film mutilating device, a support, means defining a path for said film along said support, a cutter contacting the emulsion side of said film, and means engaging said film for moving said cutter in a predetermined path relative to said support.

3. In a film mutilating device, a support, means forming a channel in said support, said channel defining a path for said film through said device, a cutter held in resilient contact with the emulsion side of said film, and means driven by said film for moving said cutter in a definite path relative to said film.

4. In a film mutilating device, a support, means forming a channel in said support through which said film may pass, a narrow emulsion removing member contacting the emulsion side of said film, and means driven by said film for moving said emulsion removing member in a predetermined path relative to said support.

5. In a film mutilating device, a support, means forming a channel in said support, said channel serving to guide said film through said device, a narrow emulsion removing member held in resilient contact with the emulsion side of said film, and means driven by the film for moving said emulsion removing member in a definite path relative to said film.

6. In a film mutilating device, a base forming a support for the device, means forming a path for said film through said device, a cutter held in resilient contact with said film, a support for said cutter, cam means in operative relation to said last support, and means associated with the film for rotating said cam, thereby causing said cutter to move in a predetermined path relative to said film.

7. In a film mutilating device, a base, a channel formed in said base defining a path for said film, a housing pivotally supported on said base, a sprocket journaled in said housing and having teeth adapted to engage said film when the housing is in its normal position on said base, an arm pivotally mounted in said housing, mechanism between said arm and said sprocket for oscillating said arm in time with the movement of said sprocket, a cutter resiliently mounted on said arm, and adapted to contact said film when the film is positioned in said channel, and an insert in the channeled portion of said base adapted to form a backing strip for the film where it is in contact with said cutter, said cutter being adapted to remove material from said film along an outline determined by the oscillation of said arm.

8. In a film mutilating device, in combination, a base, a channeled member secured to said base and adapted to define a path for said film, a hollow housing pivotally mounted on said base and adapted to be placed in cooperative relation with the channel in said member, a sprocket journalled in said housing and having teeth adapted to engage said film when said housing and said channeled member are in cooperative relation with each other, an arm pivotally mounted in said housing on an axis angular with respect to the journal of said sprocket, a cutter resiliently mounted on said arm and adapted to contact said film, cam means associated with said sprocket, an engaging member secured to said arm in cooperative relation with said cam means, a roller carried on said device and adapted to engage and guide said film entering said channel, and means for securing said housing and said channeled member in cooperative relation, whereby said cutter may remove material from said film along an outline determined by the shape of said cam when said film is drawn through said device.

9. The device set forth in claim 8 with the provision of an insert in said channeled member adapted to form a backing strip for the film where it is in contact with said cutter.

10. In a mutilating device for motion picture film, a base forming a support for the device, channel means on said base forming a path for said film through said device, a cutter held in resilient contact with said film, and mechanism engaged by the film for moving said cutter laterally in said channel, thereby causing said cutter to remove material from said film along a line which varies from frame to frame in said film.

11. In a film mutilating device, in combination, a base, a film guide member secured to said base, a housing movably carried on said base and adapted to be moved into cooperative relation with said guide to close said device, a sprocket shaft in said housing, a sprocket in said shaft having a hub and flanged portions provided with teeth adapted to engage said film when said device is closed, an arm pivotally mounted in said housing on an axis angular with respect to said shaft, a cutter resiliently mounted on said arm and adapted to contact said film in said channel, means forming a cam in the hub of said sprocket, an engaging member secured to said arm in cooperative relation with said cam, a film roller carried on said device and adapted to engage and guide film entering said channel, and means for securing said guide and said housing together in the closed position, whereby said cutter may remove material from said film along an outline controlled by said cam when film is drawn through said device.

12. A device according to claim 11, in which the cutter may be comprised of a diamond or other hard material and in which a support for said cutter is pivotally mounted on said arm and in which spring means is provided acting against said pivoted support to resiliently maintain said cutter in engagement with the face of the film, said spring means permitting said cutter to ride over splices or joints in the film.

13. A device according to claim 11, in which said base is of substantial weight so that said device may be positioned between two reel supports on a rewinding table without the necessity of having to secure said base to the table, whereby said device may be caused to mutilate said film while the latter is being rewound.

14. A device according to claim 11, in which said base is of substantial thickness and is made solid in order to give it substantial weight and is further provided with feet which frictionally engage the surface of a rewinding table or bench when said device is positioned between two reel supports to mutilate film while the same is being rewound.

JACOB WOERMANN.